US010050666B2

(12) United States Patent
Xie (10) Patent No.: US 10,050,666 B2
(45) Date of Patent: Aug. 14, 2018

(54) DEVICES FOR DETECTING ULTRA-WIDE BAND SIGNALS (71) Applicants: MAXIM INTEGRATED PRODUCTS, INC., San Jose, CA (US); Min Xie, Sunnyvale, CA (US)

(72) Inventor: Min Xie, Sunnyvale, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 15/527,954

(22) PCT Filed: Nov. 16, 2015

(86) PCT No.: PCT/US2015/060835
§ 371 (c)(1),
(2) Date: May 18, 2017

(87) PCT Pub. No.: WO2016/081349
PCT Pub. Date: May 26, 2016

(65) Prior Publication Data
US 2017/0366224 A1 Dec. 21, 2017

Related U.S. Application Data (60) Provisional application No. 62/081,976, filed on Nov. 19, 2014.

(51) Int. Cl.
H04B 1/7163 (2011.01)
H04B 1/16 (2006.01)

(52) U.S. Cl.
CPC .......... H04B 1/71637 (2013.01); H04B 1/16 (2013.01)

(58) Field of Classification Search
CPC .............................. H04B 1/71637; H04B 1/16
See application file for complete search history.

(56) References Cited

U.S. PATENT DOCUMENTS 7,006,553 B1 * 2/2006 McCorkle .............. H04B 1/719
348/607
7,403,576 B2 * 7/2008 Lakkis ............... H04B 1/71637
375/316

(Continued)

FOREIGN PATENT DOCUMENTS

KR 1020140077793 A 6/2014

OTHER PUBLICATIONS

International Search Report dated Feb. 22, 2016, in International Application No. PCT/US2015/060835, filed Nov. 16, 2015 (3pgs).

(Continued)

Primary Examiner — Kenneth Lam
(74) Attorney, Agent, or Firm — North Weber & Baugh LLP (57) ABSTRACT Embodiments of the present invention include systems for determining locations of UWB transmitters. The system (100) includes multiple UWB receivers (104) for receiving a UWB signal (120) emitted by a UWB transmitter (106). Each receiver (104) includes: RF amplifiers (306) arranged in a cascade structure, the RF amplifiers (306) receive and amplify the UWB signal; multiple baseband blocks (308), each of the baseband blocks is coupled to the corresponding RF amplifier (306) and taps an output signal from the corresponding RF amplifier; and a processor (320) coupled to the multiple baseband blocks (308), the processor processes output signals from the multiple baseband blocks (308) to identify the UWB signal (120). The system (100) also includes a server (110) coupled to the multiple receivers (104), the server (110) receives the identified UWB signals from the multiple receivers (104) and determines the location of the UWB transmitter (106) using the identified UWB signals.

20 Claims, 5 Drawing Sheets (56) References Cited

U.S. PATENT DOCUMENTS

| | | |
|---|---|---|
| 2003/0011433 A1 | 1/2003 | Richley |
| 2006/0098713 A1* | 5/2006 | Tian .................. H04B 1/71637 375/130 |
| 2007/0049234 A1* | 3/2007 | McCorkle ............ H03G 3/3052 455/313 |
| 2008/0111639 A1 | 5/2008 | Ryckaert et al. |
| 2012/0275549 A1* | 11/2012 | Crepaldi .............. H04B 1/7163 375/342 |
| 2013/0195151 A1 | 8/2013 | Miller et al. |
| 2013/0235955 A1* | 9/2013 | Xu .................... H04L 25/03885 375/340 |

OTHER PUBLICATIONS

Written Opinion dated Feb. 22, 2016, in International Application No. PCT/US2015/060835, filed Nov. 16, 2015 (7pgs).

* cited by examiner

DEVICES FOR DETECTING ULTRA-WIDE BAND SIGNALS

CROSS-REFERENCE TO RELATED APPLICATIONS

This is a 371 National Stage Patent Application of International Patent Application No. PCT/US15/60835, entitled, "DEVICES FOR DETECTING ULTRA-WIDE BAND SIGNALS," naming Min Xie as inventor, and filed Nov. 16, 2015, which application claims priority to Provisional Patent Application No. 62/081,976, entitled, "DEVICES FOR DETECTING ULTRA-WIDE BAND SIGNALS," naming Min Xie as inventor, and filed Nov. 19, 2014, which applications are hereby incorporated herein by reference in their entireties.

BACKGROUND

A. Technical Field

The present invention relates to signal processing, and more particularly, to devices for detecting ultra-wide-band (UWB) signals having short pulse widths.

B. Background of the Invention

UWB is a radio technology that is used at a very low energy level for short-range, high-bandwidth communications using a large portion of the radio spectrum. Recently, UWB has been applied to collect target sensor data, locate and track target sensors with high precision. Receivers of UWB signals that are transmitted by UWB transmitters should be able to handle incoming UWB signals over a wide range of dynamic range. As the pulse widths of UWB signals decrease to the order of nanosecond, the conventional UWB receivers cannot dynamically adjust the gain of its amplifier or the reference levels of its analogue-digital-comparator (ADC) during the short pulse width.

Another challenge that a UWB engineer has to cope with is associated with multipath reflections of a strong pulse in the digital domain. When a UWB transmitter transmits a UWB signal, the signal may be reflected by objects before it arrives at a UWB receiver. As such, when an incoming signal is reconstructed/represented by the UWB receiver in the digital domain, the reflected signals (or, equivalently, multipath reflections) may be superimposed onto the original incoming UWB signal, causing significant complexity in the analysis of the received UWB signal.

Thus, there is a need for a receiver architecture that allows digital reconstruction/representation of the incoming UWB signal with short duration without adjusting the dynamic gain of an amplifier or reference levels of an ADC in the receiver.

SUMMARY OF THE DISCLOSURE

In one aspect of the present invention, an apparatus for processing an ultra-wide-band (UWB) signal includes: a plurality of RF amplifiers arranged in a cascade structure, the plurality of RF amplifiers receives and amplifies a UWB signal, the UWB signal comprising an envelope signal modulated with a radio frequency (RF) carrier signal; a plurality of baseband blocks, each of the plurality of baseband blocks is coupled to a corresponding one of the plurality of RF amplifiers, at least one of the baseband blocks taps an output signal from the corresponding one of the plurality of RF amplifiers; and a processor coupled to the plurality of baseband blocks, the processor processes an output signal from at least one of the plurality of baseband blocks to convert the envelope signal into a digital domain.

In another aspect of the present invention, a system for determining a location of an ultra-wide-band (UWB) transmitter includes multiple receivers for receiving a UWB signal emitted by a UWB transmitter. Each of the multiple receivers includes: a plurality of RF amplifiers arranged in a cascade structure, the plurality of RF amplifiers receives and amplifies the UWB signal; a plurality of baseband blocks, each of the baseband blocks is coupled to a corresponding one of the plurality of RF amplifiers and taps an output signal from the corresponding one of the plurality of RF amplifier; and a processor coupled to the plurality of baseband blocks, the processor processes an output signal from at least one of the plurality of baseband blocks to identify the UWB signal. The system also includes a server coupled to the multiple receivers, the server receives identified UWB signals from the multiple receivers and determines the location of the UWB transmitter using the identified UWB signals.

DETAILED DESCRIPTION OF THE PREFERRED EMBODIMENTS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. The terms "include," "including," "comprise," and "comprising" shall be understood to be open terms and any lists that follow are examples and not meant to be limited to the listed items. Any headings used herein are for organizational purposes only and shall not be used to limit the scope of the description or the claims.

Furthermore, connections between components in the figures are not restricted to connections that are effected directly. Instead, connections illustrated in the figures between components may be modified or otherwise changed through the addition thereto of intermediary components, without departing from the teachings of the present invention.

Figure 1:
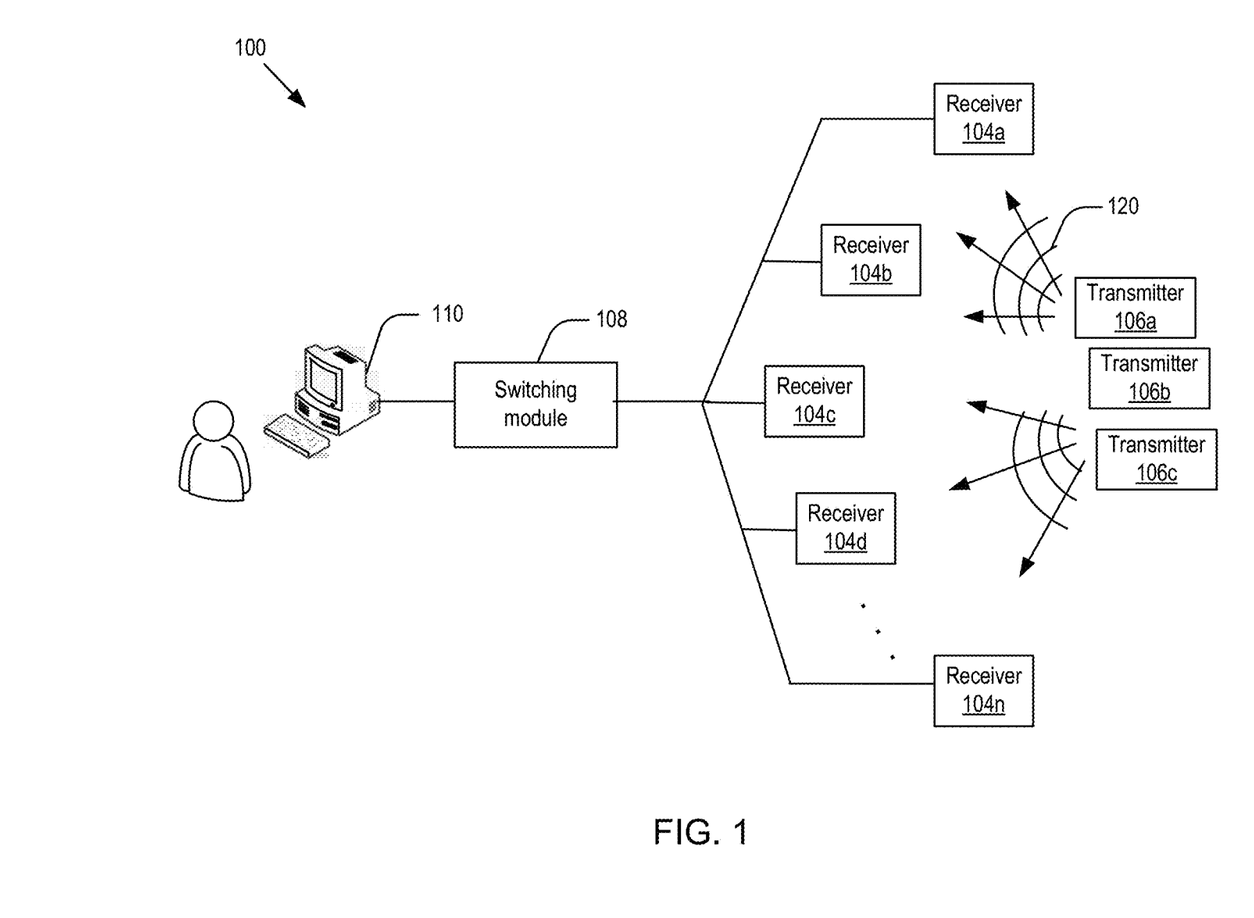
FIG. 1 shows a schematic diagram of an exemplary system for transmitting and receiving UWB signals according to one embodiment of the present invention.

FIG. 1 shows a schematic diagram of an exemplary system 100 for transmitting and receiving UWB signals according to one embodiment of the present invention. As depicted, one or more UWB transmitters 106a-106c may transmit UWB signals 120 to one or more receivers 104a-104n. The output signals from the receivers 104a-104n may be sent to a switching module 108, such as power-over-Ethernet switch, where the switching module 108 may control the data flow from the receivers 104a-104n to a server 110, such as computer. For instance, the switching module 108 may be coupled to the server 110 via a single cable for transmitting data from and providing electrical power to the receivers 104a-104n.

It should be noted that any suitable number of UWB transmitters may be included in the system 100. Likewise, it should be noted that any suitable number of UWB receivers may be included in the system 100. In embodiments, each of the transmitters 106a-106c may be a tag that is able to transmit UWB signals at a preset frequency. In embodiments, using the UWB signals received by the receivers 104a-104n and the triangulation technique, the server 110 may determine the exact locations of the transmitters 106a-106c may be determined.

Figure 2:
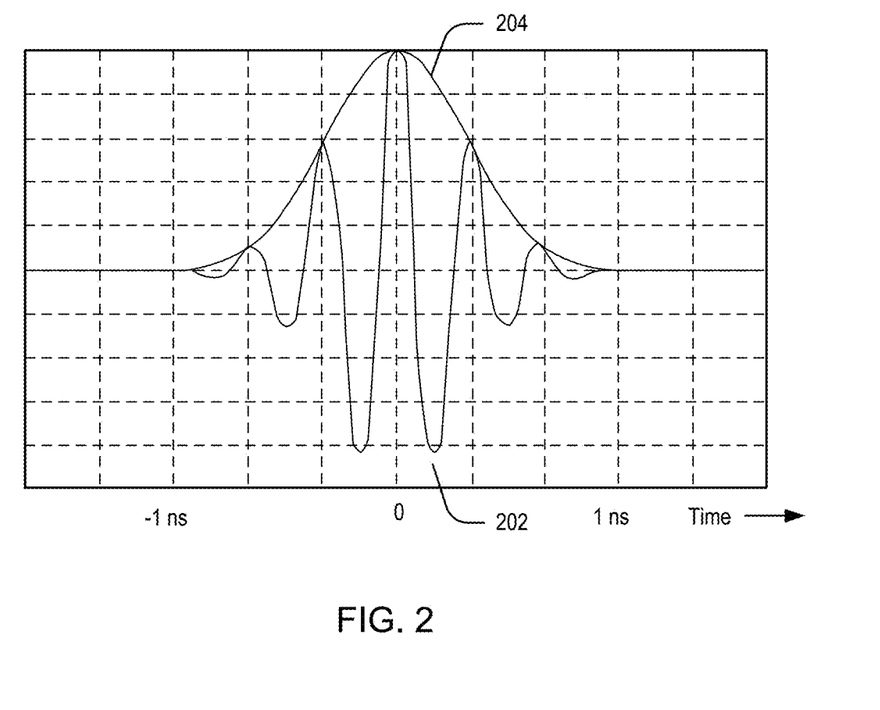
FIG. 2 shows a schematic diagram of an exemplary UWB signal according to one embodiment of the present invention.

FIG. 2 shows a schematic diagram of an exemplary UWB signal 202 (or, equivalently UWB pulse) according to one embodiment of the present invention. As depicted, a sinusoidal carrier signal at the frequency of 6.5 GHz is modulated with an input signal 204 (or, equivalently, envelope), where the pulse width of the UWB signal 202 is about two nanoseconds. A receiver, e.g. 104a, may pick up the UWB signal 202 and process the UWB signal to extract the input signal 204.

Figure 3:
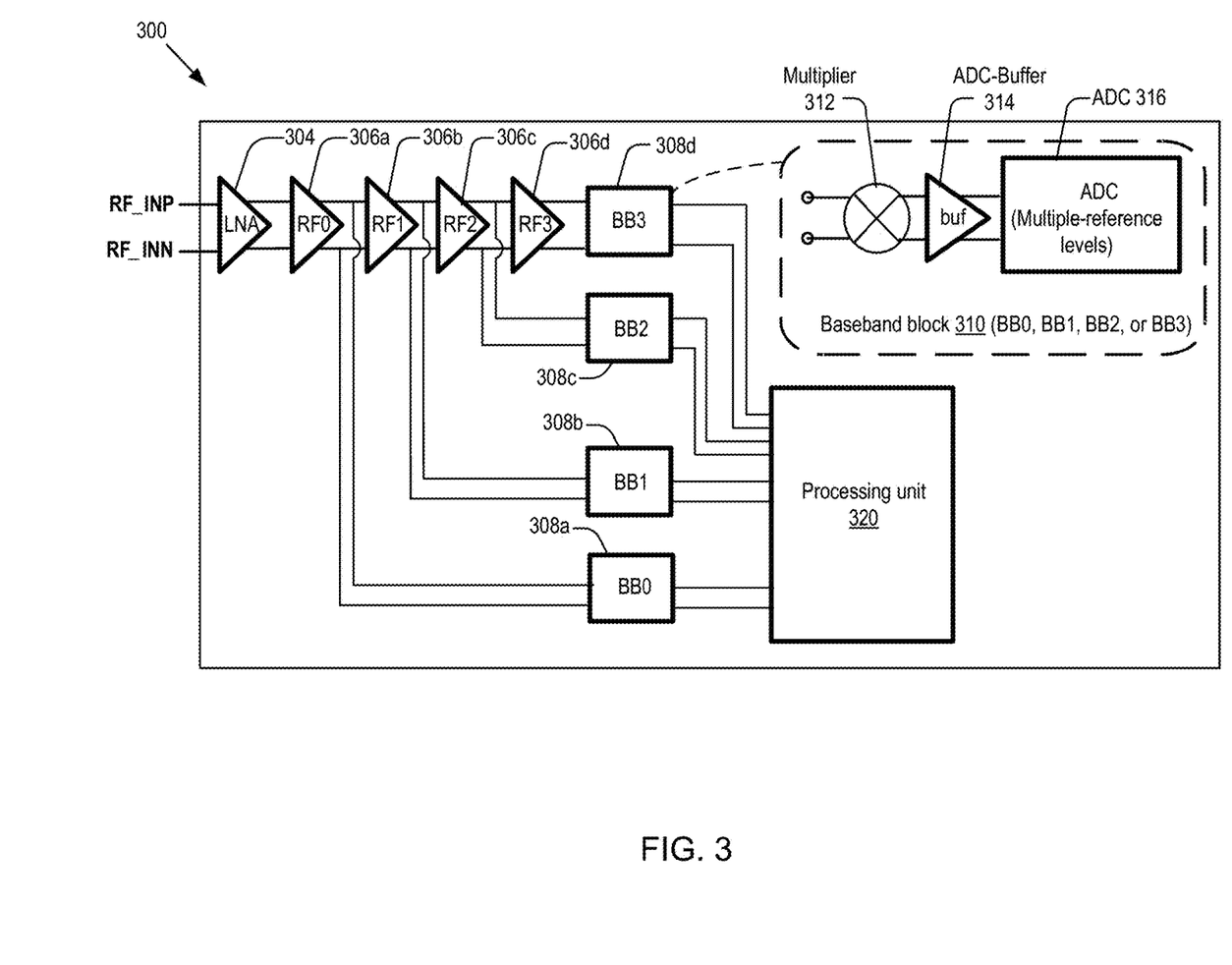
FIG. 3 shows a schematic block diagram of an exemplary UWB receiver according to one embodiment of the present invention.

FIG. 3 shows a schematic block diagram of an exemplary UWB receiver 300 according to one embodiment of the present invention. As depicted, the receiver 300 includes a low-noise-amplifier (LNA) 304; RF amplifiers 306a-306d coupled to the LNA 304 and arranged in a cascade structure; baseband blocks 308a-308d for tapping at the output signals of the corresponding RF amplifiers; and processing unit 320 for processing the output signals of the baseband blocks 308a-308d. It is noted that various types and numbers of amplifiers may be included in the receiver 300. For instance, the LNA 304 may have the gain of 18 dB and each of the RF amplifiers 306a-306d may have a gain of 12 dB. However, it should be apparent to those of ordinary skill in the art that the gains of LNA and RF amplifiers in the receiver 300 may be adjusted depending on the dynamic range of the incoming UWB signal 202. Also, other types of amplifiers may be used in place of the LNA 304 and RF amplifiers 306a-306d, depending on the frequency range of the incoming UWB signal 202.

The LNA 304 may have two ports for receiving two differential input signals (RF-INP positive and RF-INN negative) of the UWB pulse 202, amplify the input signals in the RF domain, and transmit the amplified signals to the RF amplifier 306a. The output signal of the RF amplifier 306a may be transmitted to the following RF amplifier 306b in the cascade structure. Also, the output signals of the RF amplifier 306a may be sent to the baseband block 308a, where the baseband block 308a taps at the output signal of the RF amplifier 306a. In embodiment, the baseband blocks 308a-308d may be identical and include circuit elements as shown in the enlarged diagram 310.

As depicted in the diagram 310, each baseband block may include: a multiplier 312; a buffer 314 coupled to the multiplier 312; and an analogue-digital-comparator (ADC) 316 coupled to the buffer 314. The multiplier 312 may have two input ports for receiving two output signals (i.e., positive and negative signals) of an RF amplifier, say 306a, and down-converts the UWB signal from RF to baseband signal by self-mixing of the input signals. In embodiments, the multiplier 312 may perform self-mixing of the incoming UWB signal 202 to down-convert the UWB signals. The output signals of the multiplier 312 may be sent to a buffer 314 and, subsequently, the output signals of the buffer may be sent to the ADC 316.

The ADC 316 may have multiple reference levels for triggering multiple comparators inside the ADC 316, where each reference level has a preset threshold voltage. For instance, the ADC 316 may have two comparators, where each of the two comparators has a preset threshold level and is triggered when the baseband signal exceeds the threshold level. In embodiments, the voltage difference between the reference threshold levels of the two comparators is 6 dB, i.e., the second level comparator triggers at 6 dB higher than the first level comparator. In embodiments, the cascade RF amplifiers 306a-306d and the baseband blocks 308a-308d having two-level comparators form a digitizer over 48 dB range in 6 dB steps. The weakest UWB signal will be detected by the first level comparator of the baseband block 308d (i.e., with the highest RF amplification gain), while the strongest signal will be detected by the second level comparator of the baseband block 308a (i.e., with the lowest RF amplification gain).

It is noted that other combination of RF amplifiers and baseband blocks may be used in the receiver 300. For instance, a receiver including four RF amplifiers of 8 dB gain and four ADCs having two-level comparators forms a digitizer over 32 dB range in 4 dB steps. It should be apparent to those of ordinary skill in the art that the number and gain of RF amplifiers and the number of reference levels of comparators may be varied depending on the dynamic range of incoming UWB signals and resolution of the digitization.

Figure 4:
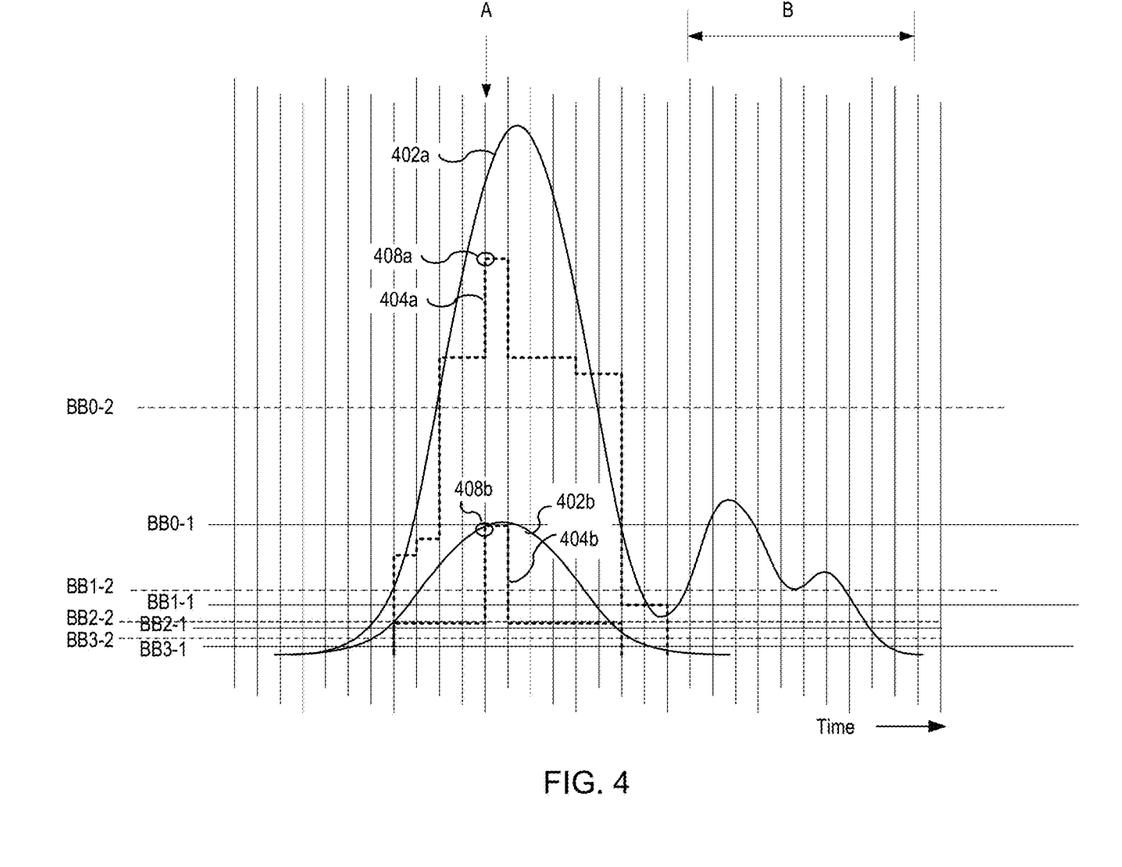
FIG. 4 shows digital representation of UWB signals according to one embodiment of the present invention.

Using the output signals from the ADCs 316, the processing unit 320 can digitize the envelope 204. FIG. 4 shows digital representation of UWB signals according to one embodiment of the present invention. As depicted, two receivers, say 104a and 104b, receive the UWB signals transmitted by two transmitters, say 106a and 106b, respectively, and process the UWB signals to obtain two envelopes 402a and 402b, respectively. Then, the envelopes 402a and 402b may be digitized by eight comparators included in the receivers and reconstructed/represented as digital signals 404a and 404b by the processor unit 320, respectively, in the digital domain. The horizontal lines BB0-1 and BB0-2 in FIG. 4 represent the threshold levels of the first and second comparators of BB0 308a. Likewise, the other horizontal lines represent the threshold levels of the other comparators of baseband blocks. For instance, the horizontal lines BB3-1 and BB3-2 represent the threshold levels of the first and second comparators of BB3 308d.

The digital signal 404a may be obtained by processing the voltage signals from comparators that are triggered by the signal 402a at each point in time. By way of example, for the signal 402a, the voltage outputs from the eight comparators may be added to reach the level 408a at point A, while, for the signal 402b, the voltage outputs from the six comparators, BB1-1-BB3-2, may be added to reach the level 408b. It is noted that, unlike the conventional systems that require dynamic gain adjustments, the receiver 300 having the cascade structure of RF amplifiers and baseband blocks does not require dynamic gain adjustment to digitize the UWB signals having very narrow pulse widths.

The signal 402a may be an envelope of a UWB signal 120 transmitted by a transmitter, say 106, and received by a receiver, say 104a. When the strength of the UWB signal 120 is strong, this signal may be reflected by other object(s) before arriving at the receiver 104a. This reflected signal (or, equivalently, multipath reflection) may be also received by the same receiver 104a and superimposed onto the directly arriving UWB signal (or, shortly, direct signal). In FIG. 4, the reflected signals are superimposed to appear as ringing signals in the time interval B. Since the receiver 300 can detect the peak value 408a without dynamic gain adjustment, it has the knowledge of the strength of the direct signal, and based on this knowledge, it can anticipate the arrival of the reflected signals and distinguish the reflected signals from the direct signal.

The receiver 300 may include an output port (not shown in FIG. 4) that sends the identified direct signals to the server 110. For the same UWB signal emitted by a transmitter (e.g., 106a), the server 110 may receive multiple direct signals from multiple receivers. Using the differences in the time-of-arrivals between the multiple direct signals, the server 110 may determine the exact location of the transmitter 106a. In embodiment, the triangulation technique may be used by the server 110 to determine the location.

Figure 5:
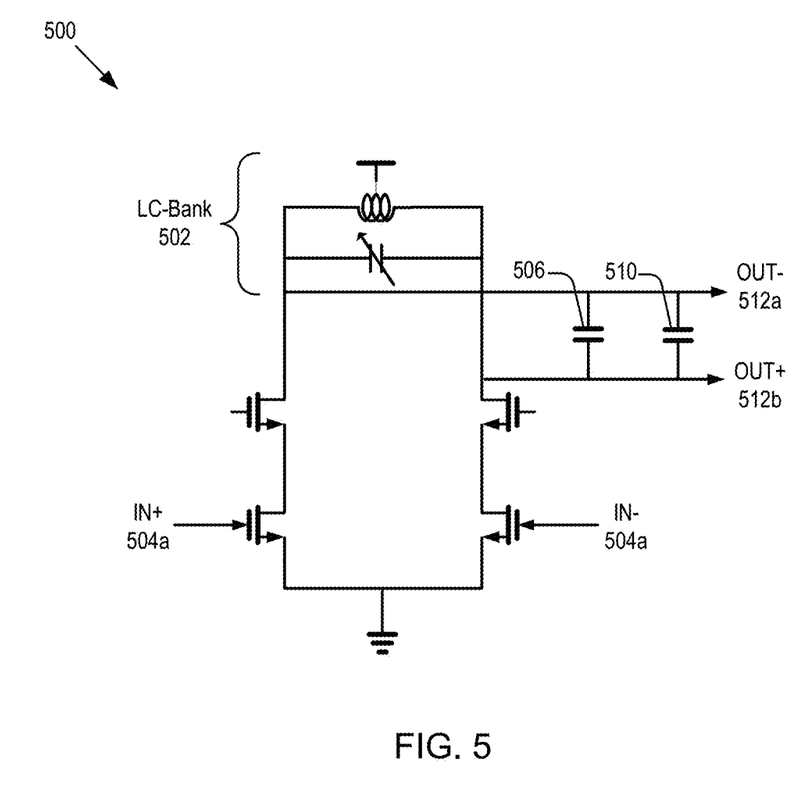
FIG. 5 shows a schematic diagram of an amplifier in a UWB receiver according to one embodiment of the present invention.

FIG. 5 shows a schematic block diagram of an amplifier 500 according to one embodiment of the present invention. As depicted, the amplifier 500 includes: two input ports 504a and 504b to receive a pair of differential input signals IN+ and IN−; two output ports 512a and 512b; and an LC-tank 502 coupled to the output ports 512a and 512b. For brevity, the other electrical components of the amplifier 500 are not described in FIG. 5.

The LC-tank 500 may be configured to resonate out the input capacitance 506 of the following RF amplifier stage in the cascade structure as well as the input capacitance 510 of the multiplier 312 of the tapping baseband block, at the carrier frequency. The LC-tank 502 reduces the loss in signal amplitude that may be caused by the baseband block tapping at each RF amplifier's output.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An apparatus for processing a ultra-wide-band (UWB) signal, comprising:
   a plurality of RF amplifiers arranged in a cascade structure, the plurality of RF amplifiers receives and amplifies a UWB signal, the UWB signal comprising an envelope signal modulated with a radio frequency (RF) carrier signal;
   a plurality of baseband blocks, each of the plurality of baseband blocks is coupled to a corresponding one of the plurality of RF amplifiers, each of the baseband blocks taps an output signal from the corresponding one of the plurality of RF amplifiers; and
   a processor coupled to the plurality of baseband blocks, the processor processes an output signal from each of the plurality of baseband blocks to convert the envelope signal into a digital domain.

2. An apparatus as recited in claim 1, wherein the UWB signal includes a pair of differential signals.

3. An apparatus as recited in claim 2, further comprising:
   a first amplifier that receives and amplifies the UWB signal and sends a pair of amplified differential signals to one of the plurality of RF amplifiers.

4. An apparatus as recited in claim 3, wherein the first amplifier comprises two input ports that receive the pair of differential signals, two output ports that send the pair of amplified differential signals, and an LC-tank that is coupled to the two output ports and resonates out an input capacitance of at least one of the plurality of RF amplifiers.

5. An apparatus as recited in claim 3, wherein the first amplifier is a low noise amplifier.

6. An apparatus as recited in claim 1, wherein the output signal from the corresponding one of the plurality of RF amplifiers includes a pair of differential signals and wherein each of the plurality of baseband blocks comprises:
   a multiplier that receives the pair of differential signals and down-converts the pair of differential signals to a baseband signal; and
   an analog-digital-comparator (ADC) that has a plurality of comparators, wherein each of the plurality of comparators has a preset threshold and sends a trigger signal when the baseband signal exceeds the preset threshold.

7. An apparatus as recited in claim 6, wherein each of the plurality of baseband blocks further comprises a buffer that receives and buffers the baseband signal and sends a buffered baseband signal to the ADC.

8. An apparatus as recited in claim 1, wherein an output signal from one of the plurality of RF amplifiers is input to another one of the plurality of RF amplifiers and a corresponding one of the plurality of baseband blocks.

9. An apparatus as recited in claim 1, wherein the processor uses the output signals from the plurality of baseband blocks to convert the envelope signal into the digital domain.

10. A system for determining a location of a ultra-wide-band (UWB) transmitter, comprising:
    multiple receivers for receiving a UWB signal emitted by a UWB transmitter, each of the multiple receivers including:
    a plurality of RF amplifiers arranged in a cascade structure, the plurality of RF amplifiers receives and amplifies the UWB signal;
    a plurality of baseband blocks, each of the baseband blocks is coupled to a corresponding one of the plurality of RF amplifiers and taps an output signal from the corresponding one of the plurality of RF amplifier; and a processor coupled to the plurality of baseband blocks, the processor processes an output signal from each of the plurality of baseband blocks to identify the UWB signal; and a device coupled to the multiple receivers, the device receives identified UWB signals from the multiple receivers and determines the location of the UWB transmitter using the identified UWB signals.

11. A system as recited in claim 10, further comprising:
a switching module disposed between the multiple receivers and the device, the switching module controls data flow from the multiple receivers to the device.

12. A system as recited in claim 11, wherein the switching module is a power-over-Ethernet switch.

13. A system as recited in claim 10, wherein the device determines the location by a triangulation technique.

14. A system as recited in claim 10, wherein the UWB includes a pair of differential signals.

15. A system as recited in claim 14, wherein each of the multiple receivers further includes:
a first amplifier that receives and amplifies the UWB signal and sends a pair of amplified differential signals to one of the plurality of RF amplifiers.

16. A system as recited in claim 15, wherein the first amplifier comprises two input ports that receive the pair of differential signals, two output ports that send the pair of amplified differential signals, and an LC-tank that is coupled to the two output ports and resonates out an input capacitance of at least one of the plurality of RF amplifiers.

17. A system as recited in claim 15, wherein the first amplifier is a low noise amplifier.

18. A system as recited in claim 10, wherein the output signal from each of the RF amplifiers includes a pair of differential signals and wherein each of the blocks comprises:
a multiplier that receives the output signal from the corresponding one of the plurality of RF amplifiers and down-converts the pair of differential signals to a baseband signal; and
an analog-digital-comparator (ADC) that has a plurality of comparators, each of the plurality of comparators has a preset threshold and sends a trigger signal when the baseband signal exceeds the preset threshold.

19. A system as recited in claim 18, wherein each of the plurality of baseband blocks further comprises a buffer that receives and buffers the baseband signal and sends a buffered baseband signal to the ADC.

20. A system as recited in claim 18, wherein the UWB signal includes an envelope signal modulated with a RF carrier signal and the processor uses the output signal from each of the plurality of baseband blocks to identify the UWB signal.

* * * * *